United States Patent
Jiang et al.

(10) Patent No.: US 12,151,362 B2
(45) Date of Patent: Nov. 26, 2024

(54) AXIAL FORCE SENSOR ASSEMBLY, ROBOT GRIPPER AND ROBOT

(71) Applicants: SHANGHAI FLEXIV ROBOTICS TECHNOLOGY CO., LTD., Shanghai (CN); FLEXIV LTD., Grand Cayman (GB)

(72) Inventors: Hao Jiang, Santa Clara, CA (US); Jinzhao Chang, Santa Clara, CA (US); Shiquan Wang, Santa Clara, CA (US)

(73) Assignees: SHANGHAI FLEXIV ROBOTICS TECHNOLOGY CO., LTD., Shanghai (CN); FLEXIV LTD., Grand Cayman (GB)

( * ) Notice: Subject to any disclaimer, the term of this patent is extended or adjusted under 35 U.S.C. 154(b) by 405 days.

(21) Appl. No.: 17/610,607

(22) PCT Filed: Jun. 28, 2020

(86) PCT No.: PCT/CN2020/098467
§ 371 (c)(1),
(2) Date: Nov. 11, 2021

(87) PCT Pub. No.: WO2022/000117
PCT Pub. Date: Jan. 6, 2022

(65) Prior Publication Data
US 2022/0305666 A1    Sep. 29, 2022

(51) Int. Cl.
*B25J 13/08* (2006.01)
*B25J 19/02* (2006.01)
(Continued)

(52) U.S. Cl.
CPC ........... *B25J 13/085* (2013.01); *B25J 19/027* (2013.01); *G01L 5/009* (2013.01); *G01L 5/16* (2013.01); *G01L 5/226* (2013.01)

(58) Field of Classification Search
CPC ....... B25J 13/085; B25J 19/027; G01L 5/009; G01L 5/16; G01L 5/226
See application file for complete search history.

(56) References Cited

U.S. PATENT DOCUMENTS

| 4,628,745 A | 12/1986 | Hatamura |
| 9,200,969 B2 * | 12/2015 | Ueno ........................ G01L 1/04 |

(Continued)

FOREIGN PATENT DOCUMENTS

| CN | 1425903 A | 6/2003 |
| CN | 102062630 A | 5/2011 |

(Continued)

OTHER PUBLICATIONS

JP-61041939-A English Translation (Year: 1986).*

(Continued)

*Primary Examiner* — Ryan D Walsh
(74) *Attorney, Agent, or Firm* — Dorsey & Whitney LLP

(57) ABSTRACT

An axial force sensor assembly for detecting an axial force is provided, which includes a mounting bracket and a first sensor assembled on the mounting bracket. The mounting bracket includes an inner mounting portion, an outer mounting portion and a multi-layer connecting member connected between the inner mounting portion and the outer mounting portion. The multi-layer connecting structure is more compliant in a direction of the axial force to be detected than in other loading directions. The first sensor is configured to detect a relative displacement between the inner mounting portion and the outer mounting portion in the direction of the axial force to be detected.

17 Claims, 5 Drawing Sheets

(51) Int. Cl.
  *G01L 5/00* (2006.01)
  *G01L 5/16* (2020.01)
  *G01L 5/22* (2006.01)

(56) References Cited

U.S. PATENT DOCUMENTS

| | | | |
|---|---|---|---|
| 2012/0180575 A1* | 7/2012 | Sakano | G01L 5/165 |
| | | | 73/862.626 |
| 2018/0099421 A1 | 4/2018 | Ogata | |
| 2019/0030724 A1* | 1/2019 | Fujikawa | B25J 13/085 |
| 2020/0001472 A1 | 1/2020 | Jiang et al. | |
| 2022/0316968 A1* | 10/2022 | Jiang | G01L 3/04 |

FOREIGN PATENT DOCUMENTS

| | | |
|---|---|---|
| CN | 102095534 A | 6/2011 |
| CN | 102062630 B | 6/2012 |
| CN | 102589792 A | 7/2012 |
| CN | 109318245 A | 2/2019 |
| CN | 110017924 A | 7/2019 |
| CN | 110243528 A | 9/2019 |
| CN | 111183007 A | 5/2020 |
| CN | 111183337 A | 5/2020 |
| JP | 61041939 A * | 2/1986 |
| JP | S6141939 A | 2/1986 |
| JP | H0396828 A | 4/1991 |
| JP | 2017058337 A | 3/2017 |
| JP | 2017187510 A | 10/2017 |
| KR | 20140083158 A | 7/2014 |

OTHER PUBLICATIONS

Office Action for Chinese Application No. 202010598427.1 mailed Jan. 19, 2022.
International Search Report from International Application No. PCT/CN2020/098467 mailed Mar. 25, 2021.
Extended European Search Report for European Application No. 20942762.4 mailed May 26, 2023.
Office Action for Japanese Application No. 2022-571244 mailed Nov. 27, 2023.

* cited by examiner

AXIAL FORCE SENSOR ASSEMBLY, ROBOT GRIPPER AND ROBOT

CROSS REFERENCE TO RELATED APPLICATIONS

The application is a U.S. National Stage of International Application No. PCT/CN2020/098467, filed Jun. 28, 2020, the contents of which is incorporated herein by reference in its entirety.

TECHNICAL FIELD

The present disclosure generally relates to sensing structures, and more particularly to an axial force sensor assembly, a robot gripper having the axial force sensor assembly, and a robot having the robot gripper.

BACKGROUND

Existing force sensors mostly use strain gauges to detect the local strain of a deformed structure under loads. These sensors use contact-based, resistive strain transducers attached to the deformable structure to detect the deformation of the structures based on the resistance change of a resistor. However, the deformable structures are intrinsically sensitive to temperature variations, contact bonding materials, complex strains in all directions, stress concentrations, and impacting loads, etc. Non-contact-based force sensors use capacitive, inductive, or optical transducers to pick up global displacements due to structural deformations under loads, thus eliminating some drawbacks of strain gauge sensors related to the resistive sensing, local stress and bonding issues. However, most of the non-contact-based force sensors can be susceptive to sensing noise caused by off-axis loads, because it is difficult to make a structure that can only deform under a certain load (e.g. axial force) but very resistant to other loads (e.g. bending moment).

SUMMARY

According to one aspect of the present disclosure, there is provided an axial force sensor assembly for detecting an axial force. The axial force sensor assembly includes a mounting bracket and a first sensor. The mounting bracket includes an inner mounting portion, an outer mounting portion and a multi-layer connecting member connected between the inner mounting portion and the outer mounting portion. The multi-layer connecting structure is more compliant in a direction of the axial force to be detected than in other loading directions. The first sensor is assembled on the mounting bracket and configured to detect a relative displacement between the inner mounting portion and the outer mounting portion in the direction of the axial force to be detected.

According to another aspect of the present disclosure, there is provided a robot gripper that includes a gripping device and an axial force sensor assembly configured to detect an axial force that the gripping device applies thereon. The axial force sensor assembly includes a mounting bracket and a first sensor. The mounting bracket includes an inner mounting portion, an outer mounting portion and a multi-layer connecting member connected between the inner mounting portion and the outer mounting portion. The multi-layer connecting structure is more compliant in a direction of the axial force to be detected than in other loading directions. The first sensor is assembled on the mounting bracket and configured to detect a relative displacement between the inner mounting portion and the outer mounting portion in the direction of the axial force to be detected.

According to yet another aspect of the present disclosure, there is provided a robot having a robot gripper. The robot gripper includes a gripping device and an axial force sensor assembly configured to detect an axial force that the gripping device applies thereon. The axial force sensor assembly includes a mounting bracket and a first sensor. The mounting bracket includes an inner mounting portion, an outer mounting portion, and a multi-layer connecting member connected between the inner mounting portion and the outer mounting portion. The multi-layer connecting structure is more compliant in a direction of the axial force to be detected than in other loading directions. The first sensor is assembled on the mounting bracket and configured to detect a relative displacement between the inner mounting portion and the outer mounting portion in the direction of the axial force to be detected.

Details of one or more embodiments of the present disclosure are set forth in the accompanying drawings and description below. Other features, objects, and advantages of the disclosure will become apparent from the description, the drawings, and the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
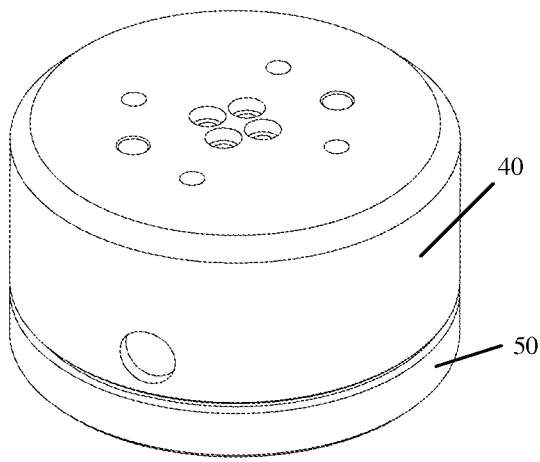
FIG. 1 is a perspective view of an axial force sensor assembly according to an embodiment of the present disclosure.

It is noted that the drawings of the disclosure are not to scale. The drawings are intended to depict only typical aspects of the disclosure, and therefore should not be considered as limiting the scope of the disclosure.

DETAILED DESCRIPTION OF THE EMBODIMENTS

Aspects and advantages of the invention will be set forth in part in the following description, or may be obvious from the description, or may be learned through practice of the invention.

Referring to FIG. 1 to FIG. 5, one aspect of the present disclosure provides an axial force sensor assembly 10 that includes a mounting bracket 20 and a first sensor 30 assembled on the mounting bracket 20. The mounting bracket 20 is primarily made of one or multiple linear material, such as metal, plastic, or rubber, and includes an outer mounting portion 21, an inner mounting portion 22 and a multi-layer connecting member 23 connected between the inner mounting portion 22 and the outer mounting portion 21. The first sensor 30 is configured to detect a relative displacement between the inner mounting portion 22 and the outer mounting portion 21 in a direction of the axial force to be detected, i.e., the axial direction of the axial force sensor assembly 10. The multi-layer connecting member 23 is more compliant in the direction of the axial force than in other loading directions. Specifically, the multi-layer connecting member 23 is sensitive to axial forces, which makes it easier to cause relative displacement between the inner mounting portion 22 and the outer mounting portion 21 when the axial force sensor assembly 10 is subjected to the axial forces than forces or moments in other directions.

According to embodiments of the axial force sensor assembly 10 of the present disclosure, the multi-layer connecting member 23 is used and arranged to be connected between the inner mounting portion 22 and the outer mounting portion 21, so that a relative displacement is caused between the inner mounting portion 22 and the outer mounting portion 21 when the axial force sensor assembly 10 is subjected to an axial force, and the relative displacement can be effectively detected by the first sensor 30, thereby realizing the detection of the axial force. In addition, the multi-layer connecting member 23 can suppress, at least to some extent, the relative displacements between the inner mounting portion 22 and the outer mounting caused by non-axial forces such as off-axis forces or moments.

Figure 3:
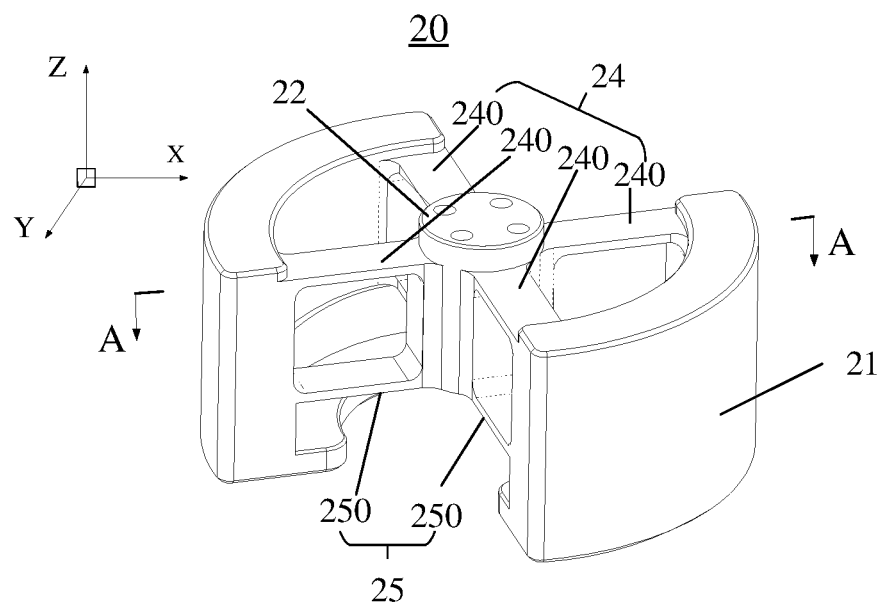
FIG. 3 is a perspective view of a mounting bracket according to an embodiment of the present disclosure.

Particularly referring to FIG. 3, in order to describe the structures of objects more clearly, a three-dimensional coordinate system defined by the axial force sensor assembly 10 is given, which includes an axial force direction, i.e. a Z direction, and two radial directions, i.e. an X direction and a Y direction. The three directions are perpendicular to one another.

In an embodiment, the multi-layer connecting member 23 may be, for example, a two-layer structure that includes a first diaphragm 24 and a second diaphragm 25. The first diaphragm 24 and the second diaphragm 25 are located at different positions in the direction of the axial force to be detected, i.e. the Z direction of the axial force sensor assembly 10 shown in FIG. 3. The multi-layer connecting member 23 may be an integral structure with the inner mounting portion 22 and the outer mounting portion 21, or may be a discrete element that is assembled to the inner mounting portion 22 and the outer mounting portion 21. It should be understood that in other embodiments, the multi-layer connecting member 23 may have more layers, for example, it may have a three-layer or four-layer structure.

The first diaphragm 24 may further include a plurality of first connecting elements 240, and the second diaphragm 25 may further include a plurality of second connecting elements 250. The first connecting elements 240 and the second connecting elements 250 are arranged circumferentially around the inner mounting portion 22 respectively, and each of the first connecting elements 240 and the second connecting elements 250 is configured to connect the inner mounting portion 22 and the outer mounting portion 21. In an embodiment as shown in FIG. 3, the first diaphragm 24 and the second diaphragm 25 each include four connecting elements extending radially respectively.

In an embodiment, the first diaphragm 24 and the second diaphragm 25 are identical and parallel to each other. At least part of the first connecting elements 240 and at least part of the second connecting elements 250 are aligned correspondingly in the axial force direction. In some embodiments, as shown in FIG. 3, all the first connecting elements 240 and the second connecting elements 250 are aligned correspondingly in the axial force direction.

In an embodiment, the first connecting elements 240 and the second connecting elements 250 each have a flat structure. A length of each first connecting element 240 and each second connecting element 250 is much greater than a thickness of the same. The length is along the radial direction, and the thickness is along the axial force direction. The first connecting elements 240 and the second connecting elements 250 each have a substantially straight beam structure extending in the radial direction. In this implementation, the first connecting elements 240 and the second connecting elements 250 are designed to be sensitive to axial forces and resistant to radial forces.

Figure 6:
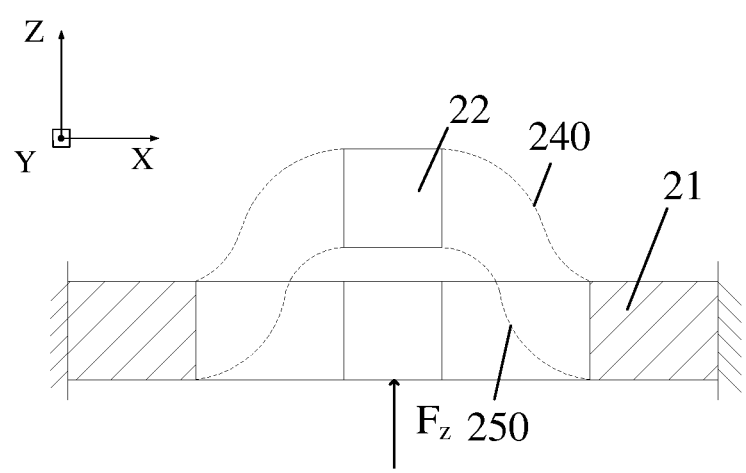
FIG. 6 is a schematic view of an axial force sensor assembly subjected to an axial force according to an embodiment of the present disclosure.

FIG. 6 is a schematic view of an axial force sensor assembly when subjected to an axial force according to an embodiment of the present disclosure. Since the two-layer structure achieves a low stiffness due to the ease of bending effect when an axial force Fz is applied on the inner mounting portion 22, the first diaphragm 24 and the second diaphragm 25 deform and a relative displacement occurs between the inner mounting portion 22 and the outer mounting portion 21. This relative displacement can be detected by the first sensor 30. Specifically, the first connecting elements 240 of the first diaphragm 24 and the second connecting elements 250 of the second diaphragm 25 each have a thin and elongated structure that is easy to deform in the axial force direction. When the axial force sensor assembly 10 is subjected to an axial force, the first connecting elements 240 and the second connecting elements 250 undergo the same deformation, and the inner mounting portion 22 moves along the axial force direction relative to the outer mounting portion 21.

Figure 7:
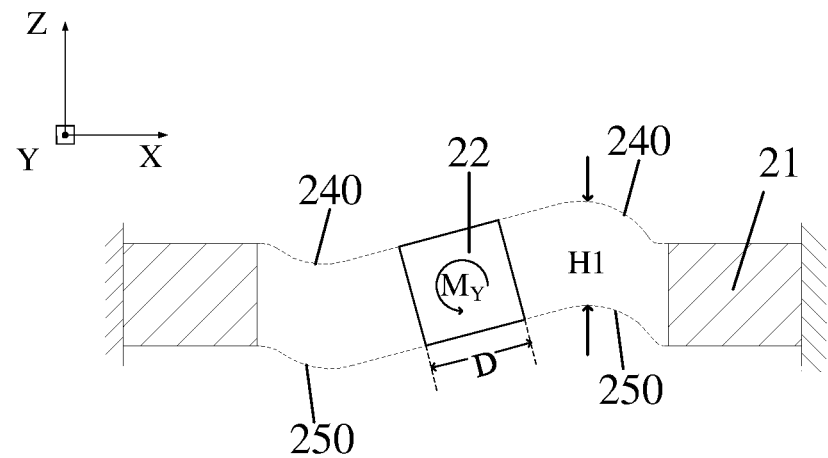
FIG. 7 is a schematic view of an axial force sensor assembly subjected to a bending moment according to an embodiment of the present disclosure.
Figure 8:
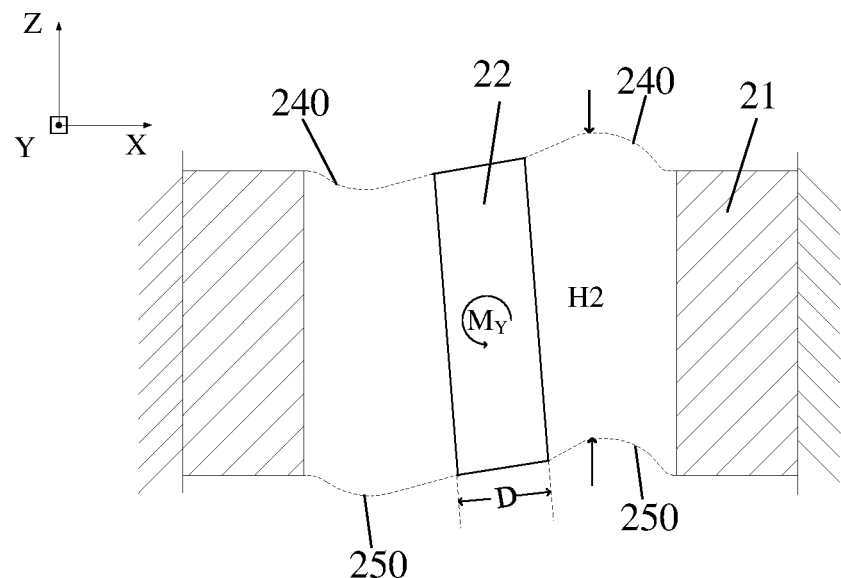
FIG. 8 is a schematic view of an axial force sensor assembly subjected to a bending moment according to another embodiment of the present disclosure.

FIG. 7 and FIG. 8 are schematic views of an axial force sensor assembly having different distances H1, H2 between the first diaphragm 24 and the second diaphragm 25 when subjected to a bending moment My about the Y direction. It can be seen from the figures that when the axial force sensor assembly 10 is subjected to the bending moment My, the first diaphragm 24 and the second diaphragm 25 change very slightly in shape and length, as tension and compression take place in the first diaphragm 24 and the second diaphragm 25. As shown in FIG. 7 and FIG. 8, the first connecting elements 240 on the left side of the inner mounting portion 22 and the second connecting elements 250 on the right side of the inner mounting portion 22 undergo compressive deformation, while the first connecting elements 240 on the right side of the inner mounting portion 22 and the second connecting elements 250 on the left side of the inner mounting portion 22 undergo tensile deformation. However, since the structures of the first diaphragm 24 and the second diaphragm 25 are rigid under tension and compression, they are considerably difficult to deform in the radial direction, or the amount of deformation is relatively small. Therefore, the overall relative displacement between the inner mounting portion 22 and the outer mounting portion 21 is tiny, indicating that the multi-layer connecting member 23 of the present disclosure can effectively suppress disturbance caused by the bending moment My around the radial direction. In contrast, when a diaphragm with a single-layer structure is subjected to such a bending moment, the diaphragm acts as a bending arm, and a bending deformation occurs, indicating that disturbance caused by the bending moment cannot be effectively suppressed in this case.

In some embodiments, the distance between the first diaphragm 24 and the second diaphragm 25 in the axial force direction is greater than the diameter D of the inner mounting portion 22, for example, it may be equal to or greater than 6 times of the diameter D of the inner mounting portion 22. Those of ordinary skill in the art can understand that the distance between the first diaphragm 24 and the second diaphragm 25 in the axial force direction may also be other multiples greater than the diameter D of the inner mounting portion 22. As shown in FIG. 7 and FIG. 8, a larger distance between the first diaphragm 24 and the second diaphragm 25 in the axial force direction can better resist the moment load. The larger the distance between the first diaphragm 24 and the second diaphragm 25, the smaller the displacement of the inner mounting portion 22 in the axial force direction. That is, the multi-layer connecting member 23 transforms the moment into a tension and compression behavior of the first diaphragm 24 and the second diaphragm 25, rather than a bending behavior. In an extreme example where the distance between the first diaphragm 24 and the second diaphragm 25 in the axial force direction is 10 times larger than the diameter D of the inner mounting portion 22, the external bending moment is almost completely transformed into the tension and compression of the first diaphragm 24 and the second diaphragm 25. Therefore, the axial force sensor assembly 10 can thoroughly suppress the disturbance of the bending moment in this case.

Figure 9:
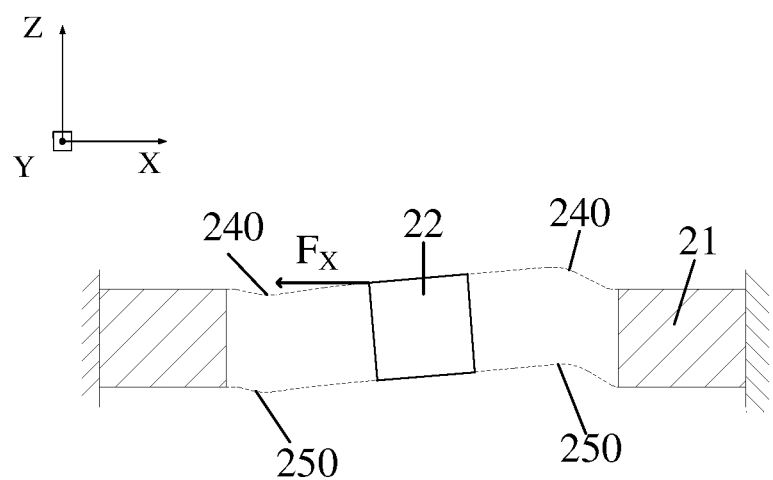
FIG. 9 is a schematic view of an axial force sensor assembly subjected to a shear force according to an embodiment of the present disclosure.

In addition, due to the structures of the first diaphragm 24 and the second diaphragm 25 that extend in radial directions, they are rigid under tension and compression. As shown in FIG. 9, when the axial force sensor assembly 10 is subjected to a shear force Fx in a radial direction, the structure of the multi-layer connecting member 23 is hardly affected by the shear force, indicating the axial force sensor assembly 10 is very effective in suppressing radial shear forces. In the embodiment shown in FIG. 3, the first diaphragm 24 and the second diaphragm 25 each have four connecting elements. In other embodiments, the number of the connecting elements may be different, for example, implementations with more connecting elements have better ability to suppress the shear force in the radial directions.

Figure 10:
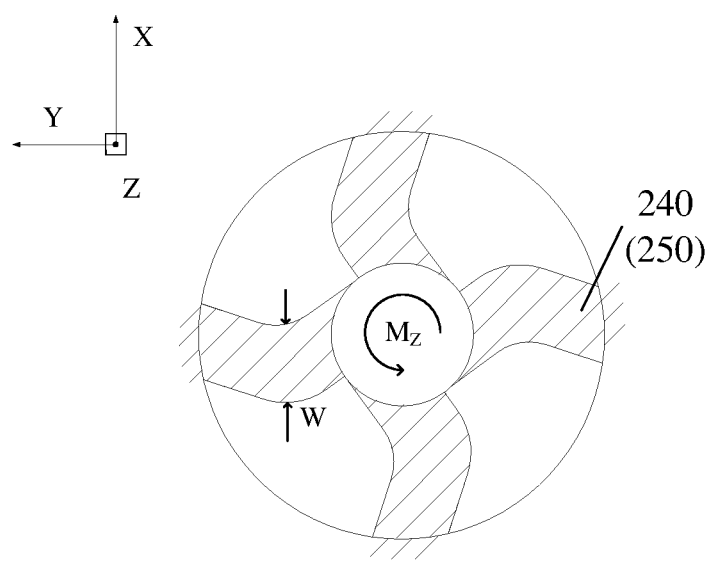
FIG. 10 is a schematic view of an axial force sensor assembly subjected to a twisting moment according to an embodiment of the present disclosure.

FIG. 10 is a schematic view of an axial force sensor assembly according to an embodiment of the present disclosure viewed from a top or bottom angle when subjected to a twisting moment Mz about the axial force direction, i.e. the Z direction. Since the multi-layer connecting member 23 is rigid in the radial directions, i.e., in the X-Y plane, the twisting moment Mz can be thus suppressed. By increasing a ratio of the width to the length of the first connecting elements 240 and the second connecting elements 250, the suppression of the twisting moment Mz can be further increased. In addition, the resistance to the twisting moment Mz can be improved by adjusting the thickness, length, and width of the first connecting elements 240 and the second connecting elements 250 without affecting the behaviors of the axial force and the bending moment.

The first sensor 30 detects the relative displacement between the inner mounting portion 22 and the outer mounting portion 21 of the multi-layer connecting member 23 in the axial force direction. In the embodiment shown in FIG. 2 and FIG. 4, the first sensor 30 including a signal emitter 300 and a signal receiver 301. The signal emitter 300 and/or the signal receiver 301 may be, for example, inductive, capacitive, resistive, optical, or may use other signaling modalities. In one embodiment, the signal emitter 300 may be a magnet and the signal receiver 301 may correspondingly be a hall effect sensor. When the inner mounting portion 22 and the outer mounting portion 21 of the multi-layer connecting member 23 undergo a relative displacement in the axial force direction, the first sensor 30 senses the change in magnetic field strength, and thus the relative displacement can be calculated accordingly. In an embodiment, a second sensor 31 is also provided. The second sensor 31 may be in the same form as the first sensor 30, but configured to have an opposite trend of signal change to the first sensor 30 when a relative displacement occurs. Base on the configuration of the two sensors having opposite trends of signal change, the axial force applied on the axial force sensor assembly 10 can be calculated more accurately from the signals of the first sensor and the second sensor by a differential method. The differential method can further help suppress other off-axis loads as well as temperature effects. For the details of the difference method, reference may be made to a previous patent application of the applicant (US Patent Application Publication No. 2020/0001472A), which is incorporated by reference into the present disclosure.

Figure 4:
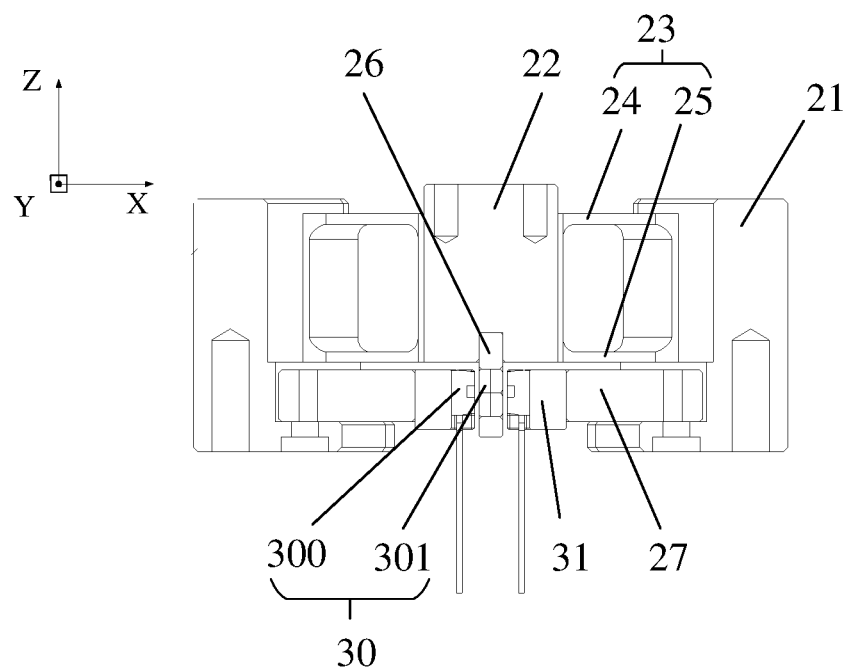
FIG. 4 is a side view of a mounting bracket according to an embodiment of the present disclosure.
Figure 5:
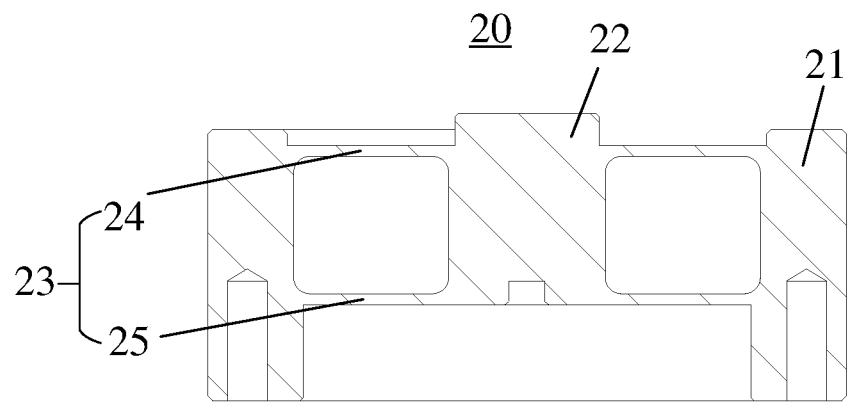
FIG. 5 is a cross-sectional view of the mounting bracket taken along the line A-A in FIG. 3.

In an embodiment, the signal emitter 300 and the signal receiver 301 are relatively stationary with the inner mounting portion 22 and the outer mounting portion 21, respectively. Specifically, the signal emitter 300 and the signal receiver 301 can move with the inner mounting portion 22 and the outer mounting portion 21 respectively to realize the detection of relative displacement between the inner mounting portion 22 and outer mounting portion 21. For example, as shown in FIG. 4, the signal emitter 300 is mounted on a plug 26 inserted into the bottom of the inner mounting portion 22 so as to maintain relatively stationary with the inner mounting portion 22, and the signal receiver 301 is mounted on a plate 27 fixed to the outer mounting portion 21 to achieve the similar purpose. In other embodiments, the signal emitter 300 and the signal receiver 301 may be directly mounted on the inner mounting portion 22 and the outer mounting portion 21, respectively. It should be understood, in other embodiments, the signal emitter 300 may be fixedly connected to the outer mounting portion 21 while the signal receiver 301 may be fixedly connected to the inner mounting portion 22.

In an embodiment, as shown in FIG. 4, the first sensor 30 is arranged closer to the inner mounting portion 22 than to the outer mounting portion 21. For example, the first sensor 30 is arranged under the inner mounting portion 22, not exceeding the boundary of the inner mounting portion 22. The closer the first sensor 30 is to the center of the axial force sensor assembly 10, the better the effect of suppressing off-axis loads.

Figure 2:
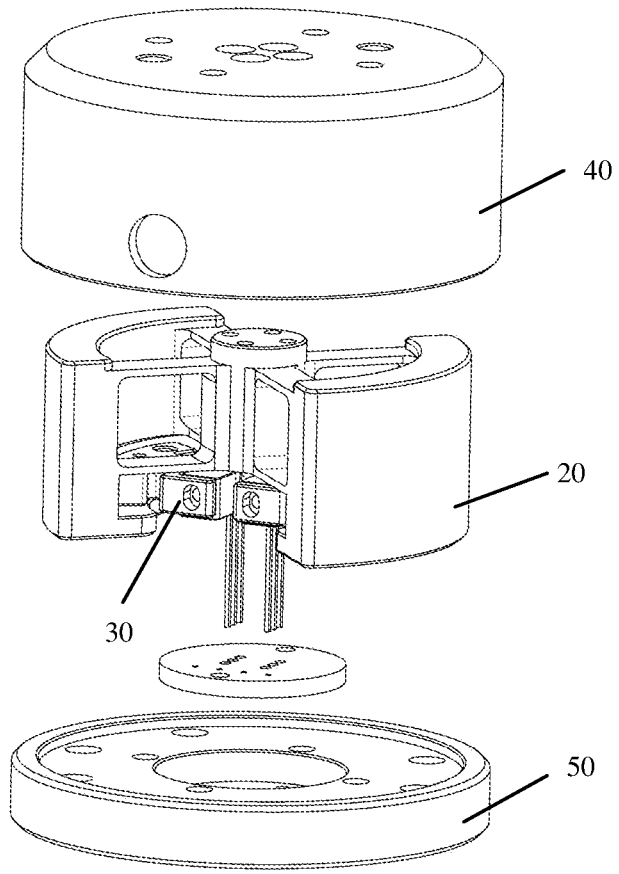
FIG. 2 is an exploded view of the axial force sensor assembly in FIG. 1.

Referring to FIGS. 1-2, in an embodiment, the axial force sensor assembly 10 further includes an upper cover 40 and a lower cover 50. The upper cover includes a space for accommodating the mounting bracket and is fixedly connected to the inner mounting portion 22, for example, by means of screw connection, welding or other methods. The lower cover 50 is fixedly connected to the outer mounting portion 21, for example, by means of screw connection, welding or other methods. By providing the upper cover 40 and the lower cover 50 that are fixed to the inner mounting portion 22 and the outer mounting portion 21 respectively, it is possible to detect an axial force that is applied on the upper cover 30 or the lower cover 40 other than on the inner mounting portion 22 or the outer mounting portion 21.

According to the above description of the embodiments, it can be understood that the present disclosure uses a multi-layer connecting member 23 as a detecting structure capable of effectively detecting the relative displacement caused by the axial force, and simultaneously suppressing the non-axial loads such as shear forces, bending moments, and twisting moments, etc. At the same time, according to the description of the structure and mechanism of the multi-layer connecting member 23, those of ordinary skill in the art can understand that in addition to the two-layer structure of the multi-layer connecting member 23 in the above embodiments, more layers of diaphragms can be used, for example, three-layer or four-layer structures which can also achieve similar or better effect of suppressing non-axial loads.

Another aspect of the present disclosure provides a robot gripper including a gripping device and an axial force sensor assembly as described in any of the above embodiments. The axial force sensor assembly is configured to detect an axial force that the gripping device applies thereon.

Yet another aspect of the present disclosure provides a robot including a robot gripper as described above.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "includes" when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about", "approximately" and "substantially," are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. An axial force sensor assembly for detecting an axial force, the axial force sensor assembly comprising:
    a mounting bracket comprising an inner mounting portion, an outer mounting portion and a multi-layer connecting member connected between the inner mounting portion and the outer mounting portion, wherein the multi-layer connecting member comprises a first diaphragm and a second diaphragm that are located at different positions in a direction of the axial force to be detected along an axial force direction defined by the axial force sensor assembly, and the multi-layer connecting structure is more compliant in a direction of the axial force to be detected than in directions other than the direction of the axial force to be detected; and
    a first sensor assembled on the mounting bracket and configured to detect a relative displacement between the inner mounting portion and the outer mounting portion in the direction of the axial force to be detected,
    wherein a distance between the first diaphragm and the second diaphragm in the direction of the axial force to be detected is greater than a diameter of the inner mounting portion.

2. The axial force sensor assembly according to claim 1, wherein the distance between the first diaphragm and the second diaphragm in the direction of the axial force to be detected is equal to or larger than 6 times of the diameter of the inner mounting portion.

3. The axial force sensor assembly according to claim 1, wherein the first diaphragm and the second diaphragm are identical and parallel to each other.

4. The axial force sensor assembly according to claim 1,
    wherein the first diaphragm comprises a plurality of first connecting elements arranged circumferentially around the inner mounting portion;
    wherein the second diaphragm comprises a plurality of second connecting elements arranged circumferentially around the inner mounting portion;
    wherein the first connecting elements and the second connecting elements each connect the inner mounting portion and the outer mounting portion.

5. The axial force sensor assembly according to claim 4, wherein at least some of the first connecting elements are aligned with at least some of the second connecting elements in the direction of the axial force to be detected.

6. The axial force sensor assembly according to claim 4, wherein a length of each of the first connecting elements and the second connecting elements is considerably larger than a thickness of each of the first connecting elements and the second connecting elements.

7. The axial force sensor assembly according to claim 4, each of the first connecting elements and the second connecting elements has a substantially straight beam structure extending in a radial direction of the axial force sensor.

8. The axial force sensor assembly according to claim 1, further comprising a second sensor, and the first sensor and the second sensor are configured to have opposite trends of signal changes when the axial force sensor assembly is subjected to an axial force.

9. The axial force sensor assembly according to claim 1, wherein the first sensor is arranged closer to a center of the inner mounting portion than to the outer mounting portion.

10. A robot gripper comprising:
a gripping device; and
an axial force sensor assembly configured to detect an axial force that the gripping device applies thereon, comprising:
a mounting bracket comprising an inner mounting portion, an outer mounting portion and a multi-layer connecting member connected between the inner mounting portion and the outer mounting portion, wherein the multi-layer connecting member comprises a first diaphragm and a second diaphragm that are located at different positions in a direction of the axial force to be detected along an axial force direction defined by the axial force sensor assembly, and the multi-layer connecting structure is more compliant in a direction of the axial force to be detected than in other leading directions other than the direction of the axial force to be detected; and
a first sensor assembled on the mounting bracket and configured to detect a relative displacement between the inner mounting portion and the outer mounting portion in the direction of the axial force to be detected,
wherein a distance between the first diaphragm and the second diaphragm in the direction of the axial force to be detected is greater than a diameter of the inner mounting portion.

11. The robot gripper according to claim 10, wherein the distance between the first diaphragm and the second diaphragm in the direction of the axial force to be detected is equal to or larger than 6 times of the diameter of the inner mounting portion.

12. The robot gripper according to claim 10,
wherein the first diaphragm comprises a plurality of first connecting elements arranged circumferentially around the inner mounting portion;
wherein the second diaphragm comprises a plurality of second connecting elements arranged circumferentially around the inner mounting portion;
wherein the first connecting elements and the second connecting elements each connect the inner mounting portion and the outer mounting portion.

13. The robot gripper according to claim 12, wherein a length of each of the first connecting elements and the second connecting elements is considerably larger than a thickness of each of the first connecting elements and the second connecting elements.

14. A robot comprising a robot gripper, the robot gripper comprising a gripping device and an axial force sensor assembly configured to detect an axial force that the gripping device applies thereon,
wherein the axial force sensor assembly comprises:
a mounting bracket comprising an inner mounting portion, an outer mounting portion and a multi-layer connecting member connected between the inner mounting portion and the outer mounting portion, wherein the multi-layer connecting member comprises a first diaphragm and a second diaphragm that are located at different positions in a direction of the axial force to be detected along an axial force direction defined by the axial force sensor assembly, and the multi-layer connecting structure is more compliant in a direction of the axial force to be detected than in directions other than the direction of the axial force to be detected; and
a first sensor assembled on the mounting bracket and configured to detect a relative displacement between the inner mounting portion and the outer mounting portion in the direction of the axial force to be detected,
wherein a distance between the first diaphragm and the second diaphragm in the direction of the axial force to be detected is greater than a diameter of the inner mounting portion.

15. The robot according to claim 14, wherein the distance between the first diaphragm and the second diaphragm in the direction of the axial force to be detected is equal to or larger than 6 times of the diameter of the inner mounting portion.

16. The robot according to claim 14,
wherein the first diaphragm comprises a plurality of first connecting elements arranged circumferentially around the inner mounting portion;
wherein the second diaphragm comprises a plurality of second connecting elements arranged circumferentially around the inner mounting portion;
wherein the first connecting elements and the second connecting elements each connect the inner mounting portion and the outer mounting portion.

17. The robot according to claim 16, wherein a length of each of the first connecting elements and the second connecting elements is considerably larger than a thickness of each of the first connecting elements and the second connecting elements.

\* \* \* \* \*